US009250766B2

(12) United States Patent
Gil et al.

(10) Patent No.: US 9,250,766 B2
(45) Date of Patent: Feb. 2, 2016

(54) LABELS AND TOOLTIPS FOR CONTEXT BASED MENUS

(75) Inventors: Erez Kikin Gil, Redmond, WA (US); Matthew Kotler, Sammamish, WA (US); Vignesh Sachidanandam, Mercer Island, WA (US); Mark Pearson, Renton, WA (US); Ned Friend, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/341,074

(22) Filed: Dec. 30, 2011

(65) Prior Publication Data

US 2013/0019174 A1    Jan. 17, 2013

Related U.S. Application Data

(60) Provisional application No. 61/507,983, filed on Jul. 14, 2011, provisional application No. 61/556,945, filed on Nov. 8, 2011.

(51) Int. Cl.
*G06F 3/0481* (2013.01)
*G06F 3/0482* (2013.01)
(Continued)

(52) U.S. Cl.
CPC ............ *G06F 3/0482* (2013.01); *G06F 3/0481* (2013.01); *G06F 3/0488* (2013.01); *G06F 3/04812* (2013.01); *G06F 3/04886* (2013.01);
(Continued)

(58) Field of Classification Search
CPC .............. G06F 3/0482; G06F 3/04886; G06F 2203/04807; G06F 17/3005; G06F 17/30398; G06F 17/30769; G06F 3/0481; G06F 3/04812; G06F 3/04895; G06F 9/4446

USPC ......... 715/707–709, 711, 810, 811, 817, 819, 715/825, 834
See application file for complete search history.

(56) References Cited

U.S. PATENT DOCUMENTS 6,259,446 B1    7/2001    Matheny et al.
6,281,879 B1    8/2001    Graham
(Continued)

OTHER PUBLICATIONS

"Radial Menu", Retrieved at <<http://www.eliteinfotech.info/the-temple-of-elemental-evil/radial-menu.html>>, Retrieved Date: Aug. 30, 2011, pp. 4.

(Continued)

*Primary Examiner* — Tadeese Hailu
*Assistant Examiner* — Shangao Zhang
(74) *Attorney, Agent, or Firm* — Jessica Meyers; Jim Ross; Micky Minhas

(57) ABSTRACT

Tooltips associated with a context based menu are presented for providing information about executable commands on the context based menu. Tooltips may provide information about how to interact with the context based menu including what graphical icons on the context based menu represent and what actions a user can take to execute commands from the context based menu. The tooltips may be brief labels of the commands on the context based menu and may also expand to descriptive tooltips providing more information about the commands. The tooltips may be automatically presented in response to a detected period of inactivity by a user and may additionally be presented in response to detection of a user action such as a press and hold action in association with one or more commands on the context based menu, and may be displayed in a variety of positions around the context based menu.

17 Claims, 12 Drawing Sheets

(51) Int. Cl.
*G06F 3/0488* (2013.01)
*G06F 3/0489* (2013.01)
*G06F 9/44* (2006.01)

(52) U.S. Cl.
CPC .......... *G06F 3/04895* (2013.01); *G06F 9/4446* (2013.01)

(56) References Cited

U.S. PATENT DOCUMENTS

| | | | |
|---|---|---|---|
| 6,421,716 | B1* | 7/2002 | Eldridge ........... G06F 17/30011 455/433 |
| 6,542,164 | B2 | 4/2003 | Graham |
| 6,828,988 | B2 | 12/2004 | Hudson et al. |
| 7,256,770 | B2 | 8/2007 | Hinckley et al. |
| D563,972 | S | 3/2008 | Sherry |
| 7,533,340 | B2 | 5/2009 | Hudson et al. |
| 7,570,943 | B2 | 8/2009 | Sorvari et al. |
| 7,669,125 | B2 | 2/2010 | Smirnov |
| 7,710,409 | B2 | 5/2010 | Robbin et al. |
| 7,712,049 | B2 | 5/2010 | Williams et al. |
| 7,895,531 | B2 | 2/2011 | Radtke et al. |
| 8,239,882 | B2 | 8/2012 | Dhanjal et al. |
| 8,245,156 | B2 | 8/2012 | Mouilleseaux et al. |
| 2005/0114778 | A1* | 5/2005 | Branson et al. ................ 715/711 |
| 2005/0216834 | A1 | 9/2005 | Gu |
| 2006/0085763 | A1* | 4/2006 | Leavitt et al. ................. 715/810 |
| 2006/0161871 | A1* | 7/2006 | Hotelling et al. ............. 715/863 |
| 2007/0002026 | A1* | 1/2007 | Sadler et al. .................. 345/168 |
| 2007/0055936 | A1 | 3/2007 | Dhanjal et al. |
| 2007/0168890 | A1 | 7/2007 | Zhao et al. |
| 2007/0180392 | A1† | 8/2007 | Russo |
| 2007/0254268 | A1* | 11/2007 | Adachi et al. ................. 434/112 |
| 2007/0256029 | A1† | 11/2007 | Maxwell |
| 2007/0271528 | A1† | 11/2007 | Park et al. |
| 2008/0107398 | A1* | 5/2008 | Kang et al. ...................... 386/95 |
| 2008/0209354 | A1* | 8/2008 | Stanek et al. ................. 715/767 |
| 2009/0007012 | A1* | 1/2009 | Mandic et al. ................ 715/810 |
| 2009/0037813 | A1 | 2/2009 | Newman et al. |
| 2009/0083665 | A1 | 3/2009 | Anttila et al. |
| 2009/0160768 | A1* | 6/2009 | Kumar ................. G06F 3/0386 345/158 |
| 2009/0327963 | A1 | 12/2009 | Mouilleseaux et al. |
| 2010/0192102 | A1† | 7/2010 | Chmielewski et al. |
| 2010/0283859 | A1* | 11/2010 | Shimma ..................... 348/207.1 |
| 2010/0299637 | A1 | 11/2010 | Chmielewski et al. |
| 2010/0306702 | A1* | 12/2010 | Warner ......................... 715/811 |
| 2011/0016425 | A1* | 1/2011 | Homburg et al. ............. 715/811 |
| 2011/0209074 | A1 | 8/2011 | Gill et al. |
| 2011/0209093 | A1 | 8/2011 | Hinckley et al. |
| 2011/0248928 | A1 | 10/2011 | Michaelraj |
| 2012/0036434 | A1† | 2/2012 | Oberstein |
| 2012/0042006 | A1 | 2/2012 | Kiley |
| 2012/0124472 | A1* | 5/2012 | Pine et al. .................... 715/707 |
| 2012/0221972 | A1* | 8/2012 | Patterson et al. ............. 715/810 |
| 2012/0221976 | A1 | 8/2012 | Johns |
| 2012/0306748 | A1* | 12/2012 | Fleizach et al. ............... 345/161 |

OTHER PUBLICATIONS

"30 Stylish jQuery Tooltip Plugins for Catchy Designs", Retrieved at <<http://www.1stwebdesigner.com/css/stylish-jquery-tooltip-plugins-webdesign/>>, Retrieved Date: Aug. 31, 2011, pp. 21.

"Compact Control Menu for Touch-Enabled Command", U.S. Appl. No. 13/090,438, filed Apr. 20, 2011, pp. 27.

"Context Menus and Sub-Menus", Retrieved at <<http://ignorethecode.net/blog/2009/03/21/context-menus-sub-menus/>>, Mar. 21, 2009, pp. 9.

Nguyen, Chuong, "Apple Patent Reveals GUI with Radial Pop-Up Menus in iOS", Retrieved at <<http://www.ubergizmo.com/2010/12/apple-patent-reveals-gui-with-radial-pop-up-menus-in-ios/>>, Feb. 12, 2010, pp. 3.

Koenig, Joerg, "Radial Context Menu", Retrieved at <<http://www.codeproject.com/KB/system/RadialContextMenu.aspx>>, Jul. 21, 2005, pp. 4.

"Pie menu", Retrieved at <<http://web.archive.org/web/20110331143948/http://en.wikipedia.org/wiki/Pie_menu>>, Mar. 31, 2011, pp. 5.

Hopkins, Don, "Pie Menus on Python/GTK/Cairo for OLPC Sugar", Retrieved at <<http://web.archive.org/web/20110515030103/http://www.donhopkins.com/drupal/node/128>>, May 15, 2011, pp. 10.

"Pie in the Sky", Retrieved at <<http://web.archive.org/web/20100702160443/http://jonoscript.wordpress.com/2008/10/28/pie-in-the-sky/>>, Jul. 2, 2010, pp. 33.

Fitzmaurice, et al., "PieCursor: Merging Pointing and Command Selection for Rapid In-place Tool Switching", Retrieved at <<http://www.autodeskresearch.com/pdf/p1361-fitzmaurice.pdf>>, In Proceedings of the SIGCHI Conference on Human Factors in Computing Systems, Apr. 5, 2008, pp. 10.

"Autodesk Inventor Fusion: Getting Started", Retrieved at <<http://images.autodesk.com/emea_s_main/files/Getting_Started.pdf>>, Retrieved Date: Dec. 28, 2012, pp. 9-18.

"Wacom Tablets. The basics.", Retrieved at <<http://images.autodesk.com/emea_s_main/files/Getting_Started.pdf>>, Feb. 25, 2011, pp. 11.

"ATOK for Android", Retrieved at <<http://www.youtube.com/watch?v=bZiDbz0aJKk>>, Jun. 9, 2012, pp. 2.

"Google Reveals Possible Radial Styled Menus Coming to Android", Retrieved at <<http://www.patentbolt.com/2012/07/google-reveals-possible-radial-styled-menus-coming-to-android.html>>, Jul. 31, 2012, pp. 9.

"Apple Granted a Major Radial Menus Patent for iOS and OS X", Retrieved at <<http://www.patentlyapple.com/patently-apple/2012/08/apple-granted-a-major-radial-menus-patent-for-ios-and-os-x.html>>, Aug. 14, 2012, pp. 12.

* cited by examiner
† cited by third party

LABELS AND TOOLTIPS FOR CONTEXT BASED MENUS

CROSS REFERENCE TO RELATED APPLICATIONS

This application claims the benefit of U.S. Provisional Patent Application Ser. No. 61/507,983 filed on Jul. 14, 2011 and U.S. Provisional Application Ser. No. 61/556,945 filed on Nov. 8, 2011. The disclosures of the provisional patent applications are hereby incorporated by reference for all purposes.

BACKGROUND

With the proliferation of computing and networking technologies, two aspects of computing devices have become prevalent: non-traditional (e.g., mouse and keyboard) input mechanisms and smaller form factors. User interfaces for all kinds of software applications have been designed taking typical screen sizes and input mechanisms into account. Thus, user interactions in conventional systems are presumed to be through keyboard and mouse type input devices and a minimum screen size that enables users to interact with the user interface at a particular precision.

Menus for touch-enabled or gesture-enabled devices may have special constraints and challenges. For example, such menus need to be touch and gesture enabled, and accessible with less precision than a mouse. The menus may not occupy extensive screen area and need to be flexible to changes in available screen area (e.g., landscape/portrait changes, different resolutions, appearance/disappearance of a virtual keyboard, etc.). The menus need to make use of features specific to touch devices (e.g., response to different gestures) and still work with a traditional mouse and keyboard. Users may tend to perform bursts of work on productivity applications on mobile devices—mainly read-only—not likely to be editing a long document for long hours on a mobile device. Thus, conventional menus are not geared to address this use model. They are also not comfortable and efficient in different contexts and/or positions (e.g., one finger/use of thumb/down on desk and typing). Furthermore, the command experience may need to be much richer for content creation and to provide a natural and delightful experience, which is expected with the more direct interaction that touch affords. Because displayed information is typically condensed into a smaller area in such menus, commands and actions may not always be clear to a user and result in confusion.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing labels and tooltips associated with context based menus. Tooltips may be presented in order to provide more information about a plurality of executable commands on a context based menu. The tooltips may provide information about how to interact with the context based menu including what commands are available for execution from the context based menu, what graphical icons on the context based menu represent, and what actions a user can take to execute commands from the context based menu. The tooltips may also indicate when a command is executed, what command was executed, and provide a preview of the executed command. The tooltips may be brief labels providing what the commands on the context based menu does in textual or graphic format and may also expand to descriptive tooltips providing more information about the commands. The tooltips may be automatically presented in response to a detected period of inactivity by a user and may additionally be presented in response to detection of a user action such as a press and hold action in association with one or more commands on the context based menu. The tooltips may be dynamically presented on the interior and the exterior of the context based menu in a variety of positions around the context based menu including above, below, and to the side of the context based menu near the command with which the tooltip is associated.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
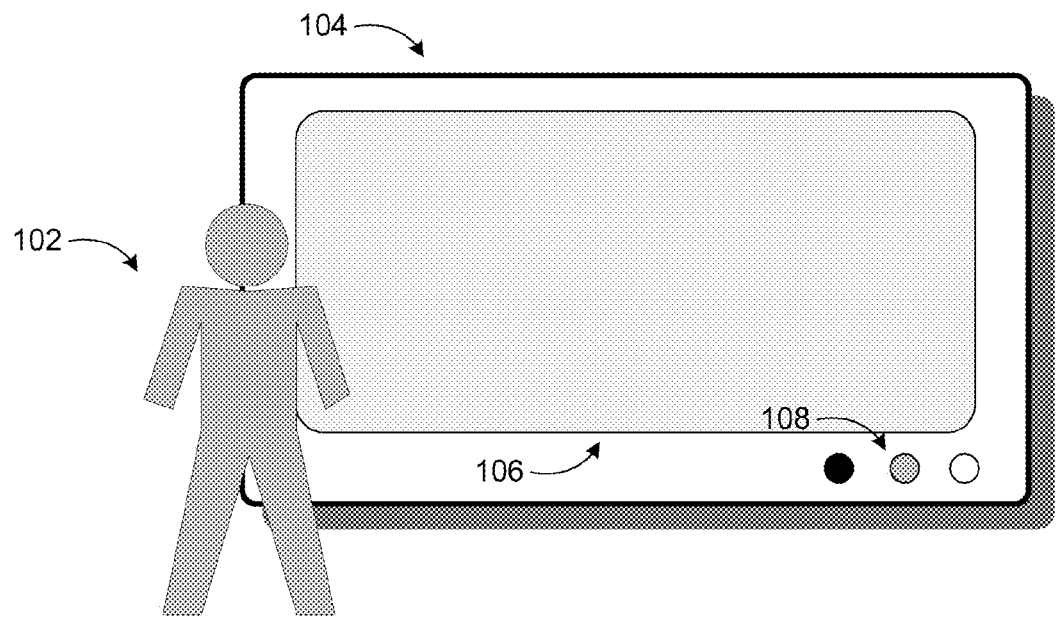
FIGS. 1A and 1B illustrate some example devices, where context based menus may be employed.
Figure 1A:
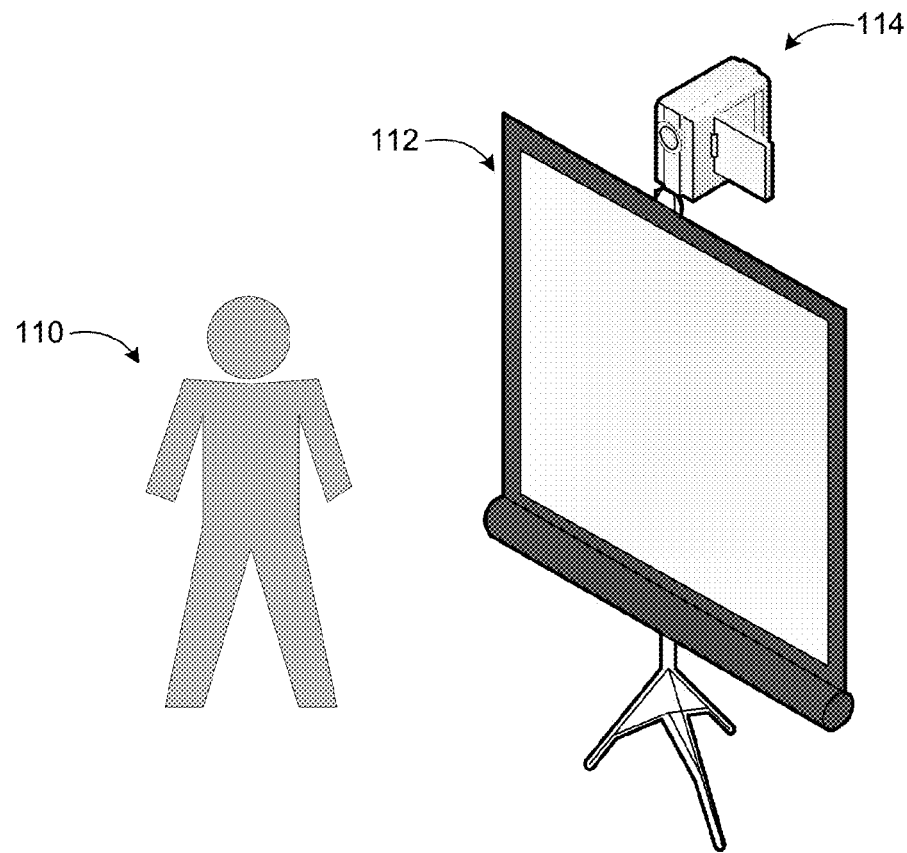

As briefly described above, tooltips may be presented in association with dynamic context based menus in order to provide information about a plurality of executable commands on the context based menu. The tooltips may be automatically presented in response to a detected period of inactivity by a user and may additionally be presented in response to detection of a user action such as a press and hold action in association with one or more commands on the context based menu.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

According to embodiments, a user interface of a touch-enabled or gesture-enabled device may employ context based menus to manage displayed content. A context based menu may make use of features specific to touch or gesture enabled computing devices, but may also work with a traditional mouse and keyboard. Context based menus are used to provide quick access to commonly used commands while viewing or editing displayed content such as documents, emails, contact lists, other communications, or any content (e.g., audio, video, etc.). Context based menus may appear as part of a user interface's regular menu, in a separate viewing pane (e.g., a window) outside or inside the user interface, and so on. Typically, context based menus present a limited set of commands for easy user access, but additional submenus may be presented upon user selection. Commonly used context based menus may appear over the viewed document. A tap or swipe action as used herein may be provided by a user through a finger, a pen, a mouse, or similar device, as well as through predefined keyboard entry combinations or a voice command.

Figure 1B:
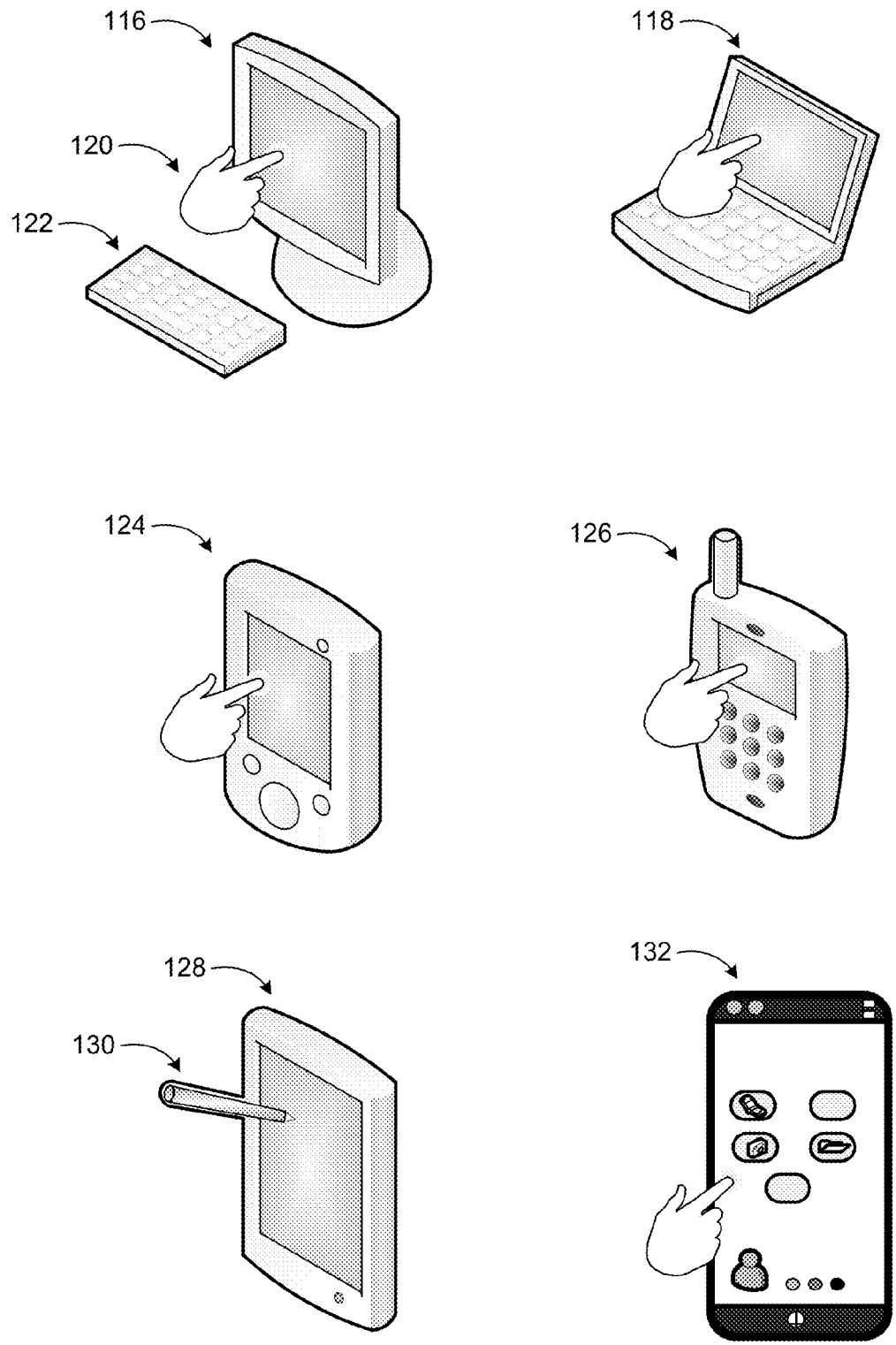

FIGS. 1A and 1B illustrate some example devices, where context based menus may be employed. As touch and gesture based technologies are proliferating and computing devices employing those technologies are becoming common, user interface arrangement becomes a challenge. Touch and/or gesture based devices, specifically portable devices, tend to have smaller screen size, which means less available space for user interfaces. For example, in a user interface that enables editing of a document (text and/or graphics), in addition to the presented portion of the document, a virtual keyboard may have to be displayed further limiting the available space ("real estate"). Thus, in such scenarios, providing a full control menu may be impractical or impossible. Some embodiments are directed to dynamic, touch or gesture enabled, context based menus.

As mentioned above, smaller available display space, larger content, and different aspect ratios make conventional menus impractical. Existing touch-based devices such as tablet PCs and similar ones are typically directed to data consumption (i.e., viewing). On the other hand, commonly used applications such as word processing applications, spreadsheet applications, presentation applications, and comparable ones are directed to creation (generating and editing documents with textual, graphical, and other content). Currently available context based menus are either invisible most of the time or they block the content when they are visible. A context based menu according to some embodiments may be provided dynamically based on presented content and available space and activated through a launcher mechanism that provides ease of use without usurping much needed display area.

As discussed above dynamic context based menus are aimed at efficient use of display area while enabling an enriched user experience. One potential concern, especially for new users, may be remembering which item on a context based menu corresponds to what command and remembering locations and actions associated with commands as different context based menus are displayed and hidden. Some embodiments are directed to providing tooltips, labels, and key tips in order to improve user experience and accessibility.

Referring to FIGS. 1A and 1B, some example devices are illustrated, where a touch or gesture enabled, context based menu may be provided through activation by a launcher mechanism according to embodiments. Embodiments may be implemented in other devices as well, with varying form factors and capabilities, as long as the devices are touch and/or gesture enabled.

Device 104 in FIG. 1A is an example of a large size display device, where a user interface may be provided on screen 106. Functionality of various applications may be controlled through hardware controls 108 and/or soft controls such as a touch or gesture enabled menu displayed on screen 106. A user may be enabled to interact with the user interface through touch actions or gestures (detected by a video capture device). The context based menu may be presented at a fixed location or at a dynamically adjustable location based on selected content, available display area, and similar factors. Examples of device 104 may include public information display units, large size computer monitors, and so on. While example embodiments are discussed in conjunction with small size displays, where available display area is valuable and location, size, content, etc. of a context based menu may be determined based on available display area; the opposite consideration may be taken into account in larger displays. For example, in a large size display such as a public information display unit or a large size computer monitor, a context based menu may be dynamically positioned near selected content such that the user does not have to reach over to the menu or have to move it in order to work comfortably.

Device 112 in FIG. 1A is an example for use of a gesture based menu to control functionality. A user interface may be displayed on a screen or projected on a surface and actions of user 110 may be detected as gestures through video capture device 114. The user's gestures may activate a touch or gesture enabled menu displayed on the device 112.

FIG. 1B includes several example devices such as touch enabled computer monitor 116, laptop computer 118, handheld computer 124, smart phone 126, tablet computer (or slate) 128, and mobile computing device 132, which may be used for computing, communication, control, measurement, and a number of other purposes. The example devices in FIG. 1B are shown with touch activation 120. However, any of these and other example devices may also employ gesture enabled activation of context based menus. In addition, tools such as pen 130 may be used to provide touch input. A launcher indicator and a touch or gesture enabled, context based menu may be controlled also through conventional methods such as a mouse input or input through a keyboard 122.

Figure 2:
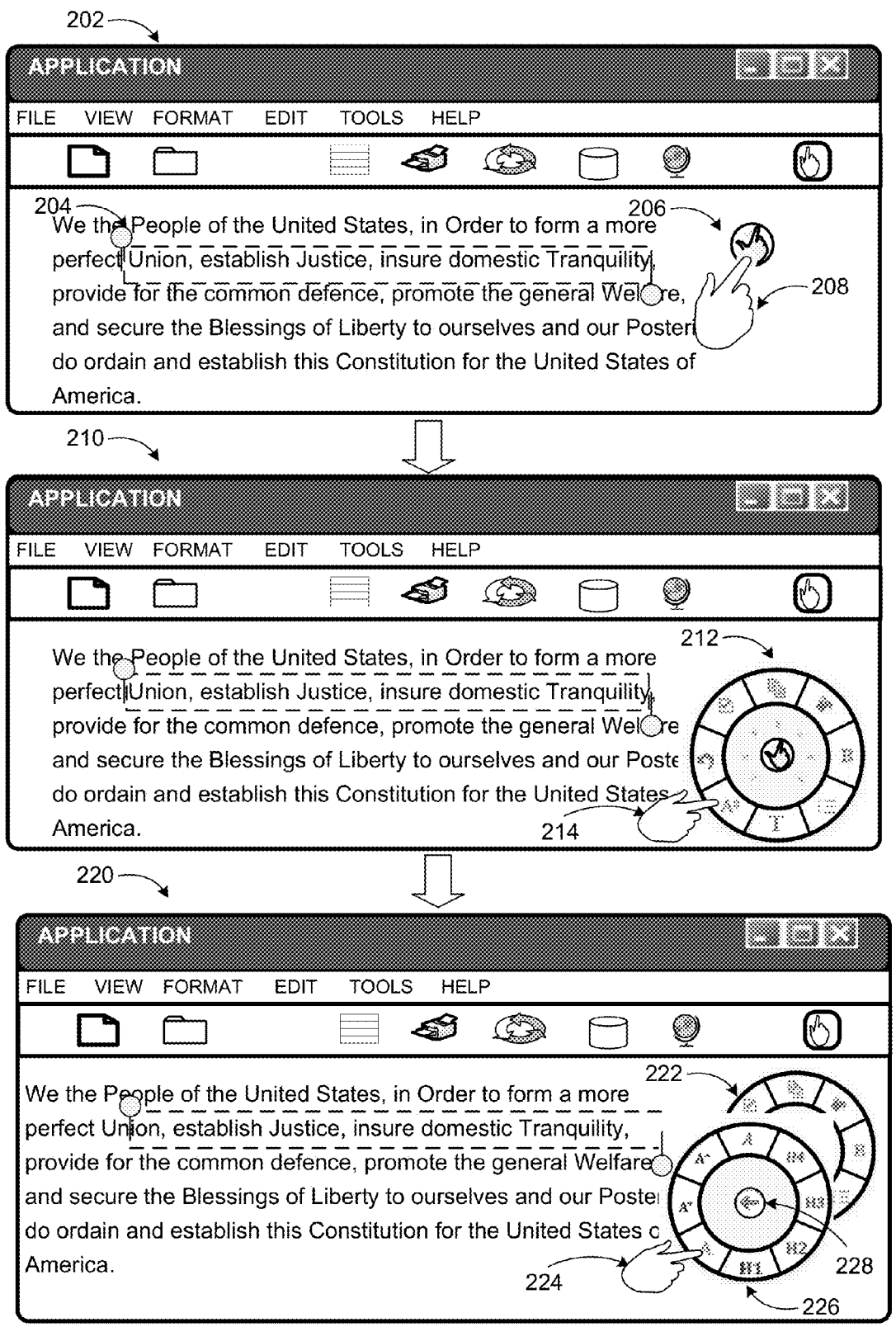
FIG. 2 illustrates launching and presentation of an example context based menu and an associated submenu according to embodiments.

FIG. 2 illustrates launching and presentation of an example context based menu and an associated submenu according to embodiments. A context based menu according to embodiments can appear close to a focus point (insertion point or selection), enable efficient invocation and/or use, allow commands to be scoped by context, provide increased scan ability (through radial shape), allow a fast learning curve for first time users, and enhance user experience. Such a menu may be implemented in any application that enables content to be viewed and/or edited such as a web browser, as well as in operating system user interfaces.

The example configurations of launcher indicator and context based menus in FIG. 2 are illustrated on example user interfaces, each of which includes textual menus, graphic command icons and textual and/or graphic content. A context based menu according to embodiments may be employed on any user interface with any type of content with or without other types of menus. Referring to user interface 202, a launcher indicator 206 may be used in vicinity of a selection 204 between selection handles on the user interface. If the user interface does not allow selection or display area is limited, a fixed location may be used for the indicator 206 and/or the underlying context based menu. Alternatively, the launcher may be hidden and a different gesture (e.g., tapping on the selection) may serve as activation for the underlying context based menu. Keyboard, mouse, touch, gesture, pen input, voice commands are some example input mechanisms that may be used in conjunction with the context based menu. Other example input mechanisms may include, but are not limited to, accelerometer or orientation sensor based input, optically captured gestures, time based input, proximity to other devices/people/places, and the like.

Upon activation (208) of the launcher indicator 206, top level context based menu 212 may be displayed, as shown on user interface 210, in relation to the selected content. The location of the context based menu may be selected at a fixed location on the user interface or a dynamically selected location based on the selected portion of the displayed content, a displayed content type, available display area, user interface borders, and/or a device type. If there is insufficient display area between the selected content and a user interface border to display the context based menu, the context based menu may be automatically moved to another location on the user interface, its size reduced, or the context based menu displayed partially. Furthermore, the context based menu 212 may be moved, its shape or size adjusted in response to a change in a size of the selected portion of the displayed content, a change in the size of the user interface, or a change in an orientation of the user interface.

While context based menu 212 is displayed in a radial shape, the menu may have a substantially radial, a substantially rectangular, a straight in-line, a curved in-line, a flower-like, or an irregular shape, and other shapes and configurations may also be employed. In the circularly or radial shaped menus, command items may be displayed on segments of the menu with a back button at the center. The back button for collapsing the menu may also be located at other positions relative to the menu such as button on rectangular menu. Upon selection of one of the command items displayed on context based menu 212 via a tap action, a swipe action, or a press and hold action (214), submenu 226 on user interface 220 may be displayed. In the example illustration submenu 226 is shown overlapping with context based menu 222. In other configurations, the submenu may replace the context based menu or be displayed at a separate location concurrently.

The items on the context based menu 222 may represent different categories of commands or links with each associated submenu presenting commands in individual categories. Upon selection (224) of a command on submenu 226 via one of the actions discussed above, the command may be applied to the selected content. When the execution of the command is complete, the submenu 226 may be hidden or remain in display. Additionally, upon selection of a back button 228, the submenu 226 may be hidden and the context based menu 212 may be displayed once again.

Figure 3A:
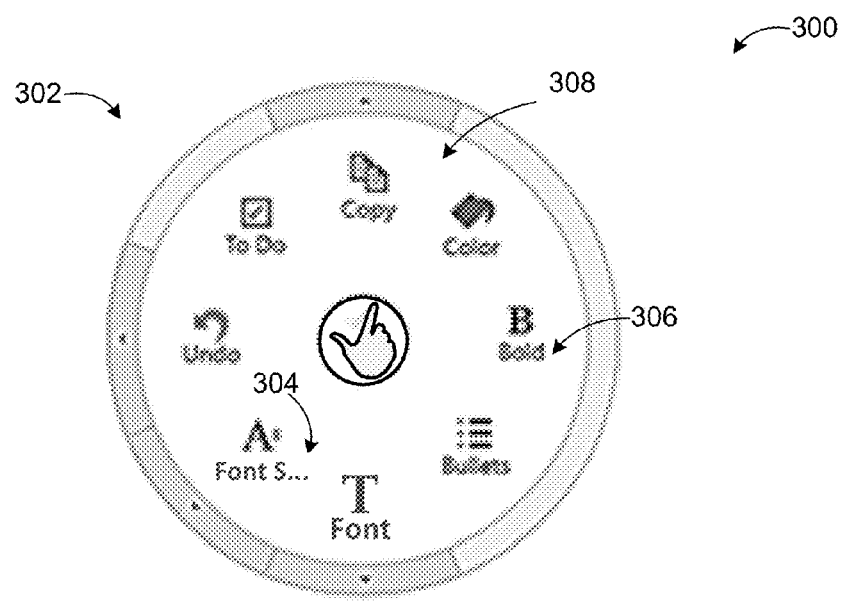
FIGS. 3A and 3B illustrate example tooltips displayed on a context based menu according to embodiments.
Figure 3A:
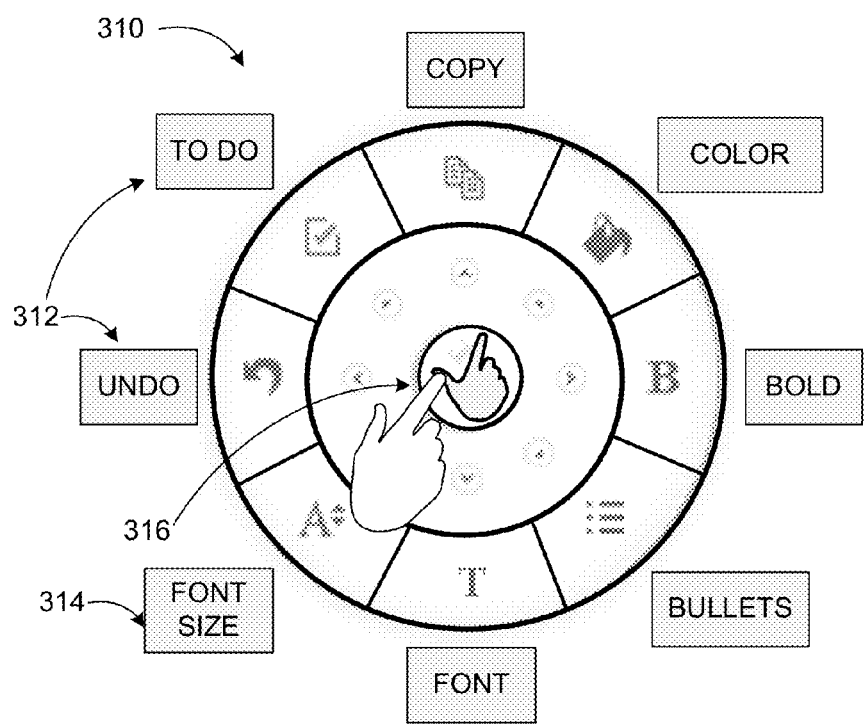
Figure 3B:
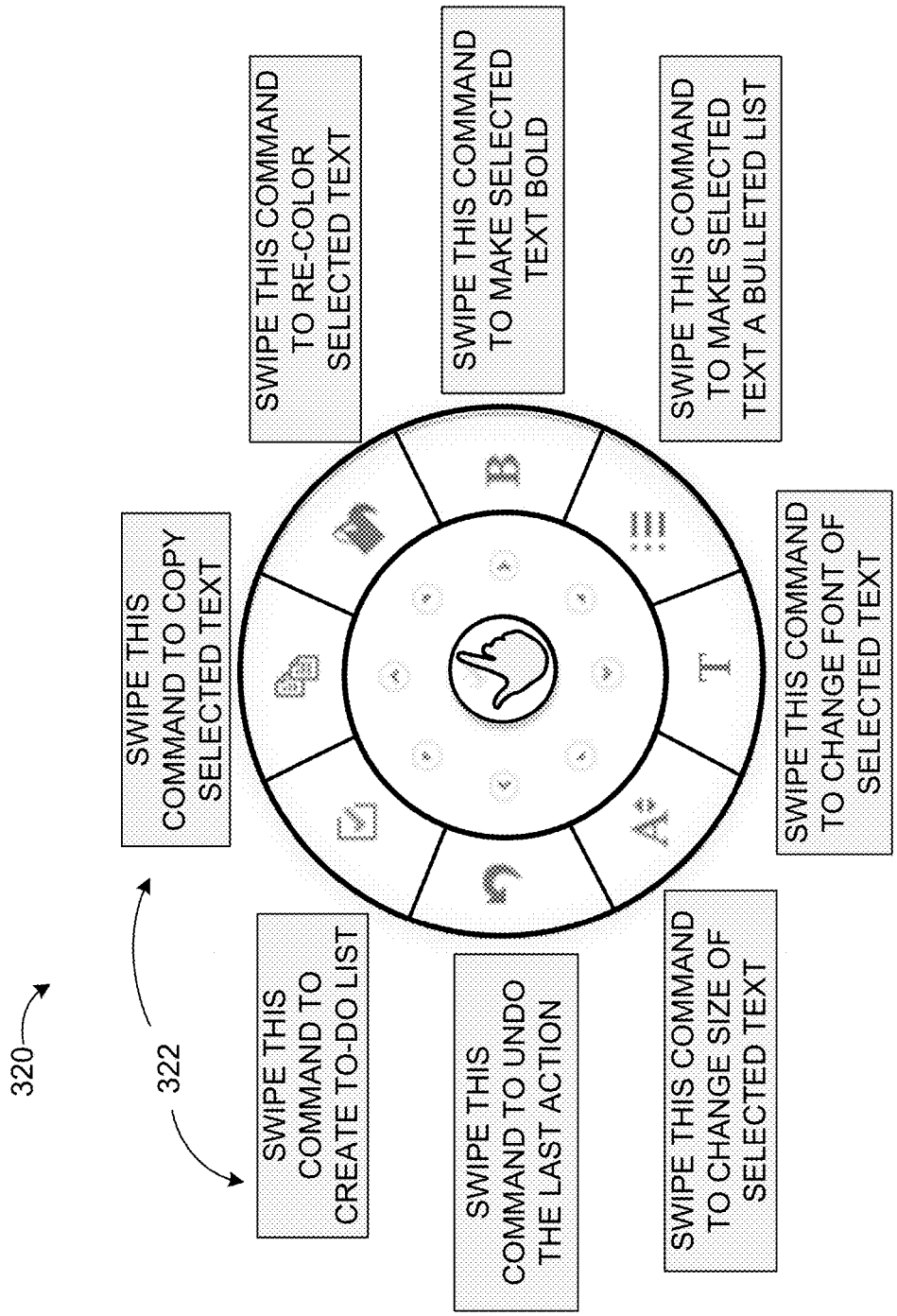

FIGS. 3A and 3B illustrate example tooltips displayed on a context based menu according to embodiments. As demonstrated in diagram 300, a system according to embodiments may utilize textual indicators, or tooltips, on a context based menu and associated submenus (the menus) in order to indicate what commands and executable actions may be available from the context based menu and submenu. A tooltip may be presented as a textual element displayed in a vicinity of a menu item or other related item as well as a textual label adjacent to a menu item (e.g., bottom, top, or side).

As described previously in conjunction with FIG. 2, a launcher indicator, a context based menu, and a submenu may display graphic command icons for representing executable commands on the menus. Since the commands may be displayed as graphical icons, displaying textual tooltips, or labels, may facilitate increasing confidence of selecting an unlabeled icon on the context based menu to execute an intended command for a user who is not familiar with the menus and icons, and also for commands whose icons are not readily obvious and discoverable. For example, as shown on context based menu 302, each graphical icon on the context based menu 302 may be accompanied by a tooltip label 306 explaining what the icon represents, such as a label stating displaying the text "Bold" next to the B icon representing the command for making a selection bold.

In an example embodiment, the tooltips may be displayed in a variety of positions around the context based menu in conjunction with the command with which the tooltip is associated. For example, in some scenarios the tooltips may be positioned on the interior 308 of the context based menu near the icons and in other scenarios the tooltips may be positioned on the exterior of the context based menu. As demonstrated in context based menu 302, the tooltip may be positioned on the interior 308 of the context based menu next to the command with which the tooltip is associated. The tooltip may be positioned beneath the icon, such as the bold tooltip label 306, and additionally, in other embodiments the label may be positioned above, to the side of, or in near proximity to the associated command. In some embodiments, when displaying the tooltips on the interior 308 of the context based menu, the icons may be shifted up or down to make room for the tooltip, and the context based menu may employ an animation scheme for shifting the icons to enhance a visual effect of the context based menu. The tooltips may not appear in this case by default and appear after a delay with the purpose to create a pleasing visual display in cases where users understand the commanding but if there is a delay (e.g., while the user is searching for a command) the tooltip appears to assist them. Additionally, if the text for the tooltip is beyond a predefined maximum length for interior labels, the tooltip text may be truncated 304 such that a portion of the text is not initially visible.

In some embodiments, the user may perform a press and hold action, or similar gesture, on the truncated 304 text, such that an additional tooltip may pop up and be displayed next to the command in order to display the full text version of the truncated 304 text. In other embodiments, the position of the tooltips or labels may be dynamically modified from an original location to a new location in response to a change on the user interface (shape, size, or content) or available display area. For example, the tooltip(s) may be displayed on a left side of the menu item(s), but moved to the right in response to display of new content and reduction of available display area to the left of the context based menu. The location of the tooltip may generally be selected based on a default parameter, an available display area, a location of the context based menu on the user interface, an attribute of a user, a content on a displayed page, and/or at least one other displayed user interface element.

In a further embodiment, as demonstrated in context based menu 310, the tooltips may be positioned on the exterior of the context based menu next to the command with which each tooltip is associated. For example, a tooltip may be displayed above the context based menu, below the context based menu, or to the side of the context based menu. Additionally, the tooltip may be positioned near the command with which it is associated on the context based menu, which may be above, below or to the side of the individual command on the context based menu based on the command's position on the context based menu. For example, the tooltip for the top command (Copy) may appear above the command, the tooltip for the bottom command (Font) may appear below the command, the tooltips for the upper side icons (To Do, Color) may appear above and to the sides of the commands, and the tooltips for the lower side commands (Font Size, Bullets) may appear below and to the sides of the commands. Additionally, the tooltips may appear slightly offset from each of the command icons in order to avoid occlusion of the tooltip by the user's finger when the user is making a selection on the context based menu. The exterior tooltips 312 may be displayed as a rectangle shape as shown in context based menu 310, and in additional embodiments, the tooltip may contain a stem linking the tooltip to the command with which it is associated. The exterior tooltips 312 may also be configured in additional shapes, such as a substantially radial, a substantially rectangular, a straight in-line, a curved in-line, and an irregular shape, and may be configured to curve around the context based menu in order to take up less space on the user interface and to enhance the visual effect for the user. The appearance and/or disappearance of the exterior tooltips may also be in an animated fashion to enhance the user experience.

In an example embodiment, the context based menu may display all of the tooltips for the commands simultaneously. As demonstrated in context based menu 310, the tooltip may be a short tooltip which may provide a label for the unlabeled command on the context based menu. The short tooltip may be limited to one line of text and limited to a maximum number of characters which may be predefined by the system, and may be customizable according to user preference. As also demonstrated in context based menu 320, each short tooltip may expand to a descriptive tooltip 322, which may accommodate multiple lines of text and a greater maximum number of characters, such that the tooltip may provide more information and descriptive text for each command than may be provided by the short tooltip.

In a system according to embodiments, the tooltips may be displayed automatically and also in response to detection of a user action such as gesture. In an example scenario, the tooltips may be automatically displayed based on predefined timing thresholds, such that the tooltips may be automatically displayed in conjunction with each command on the context based menu after a predefined period of time. For example, after a user has selected the launcher indicator to open the context based menu, upon the initial appearance of the context based menu all of the short tooltips associated with the command on the context based menu may be automatically displayed for a brief amount of time, such as ½ to 1 second for example, and then they may automatically disappear. Additionally, after the user has selected the launcher indicator to open the context based menu, if after a predefined period of time (e.g. a 2-5 second delay) the user has not made a selection of any of the commands on the context based menu, all of the tooltips associated with the commands on the context based menu may appear as shown in context based menu 310.

The tooltips may initially be displayed after the predefined period of time as short tooltips, or brief labels, for the commands. Further, if after an additional predefined period of time the user has not selected a command on the context based menu, the tooltips may expand to the descriptive tooltips 322 as shown in context based menu 320. The period of time which the system may wait before automatically displaying the tooltips and additionally automatically expanding to the descriptive tooltips may be a predefined timing threshold set by the system, and additionally, the predefined timing threshold for displaying and removing the labels may be further customizable. Additionally, the timing may change based on the number of times the user interacts with a particular menu. For example, the first three times the user interacts with a text context menu, they may see the labels immediately but on the fourth time they may see it after a five second delay.

In a further embodiment, the tooltips may be displayed upon detection of a user action on a command on the context based menu, such as a press and hold action. The press and hold action may have a timing threshold that may be longer than a timing threshold for a tap action by a user. Thus, the system may recognize the difference between a tap action for selecting and executing a command on the context based menu and a press and hold action for operating to activate and open one or more tooltips. For example, a tap action may have a tap threshold of about 200 milliseconds, and a press and hold action may have a tooltip threshold of about 1000 milliseconds. In an example scenario, upon detection of user action such as a press and hold action 316 on the center icon of the context based menu 310, all of the tooltips associated with the commands on the context based menu 310 may appear. The detected press and hold action 316 may exceed the tap threshold and be close to or equal to the tooltip threshold such that the user action is recognized as a command to open the tooltips and not to execute the command associated with tapping the center icon of the context based menu. Further, upon detection of an additional user press and hold action 316 on the center button of the context based menu, the tooltips may expand to the descriptive tooltips 322 as shown in context based menu 320. In addition, media elements like images may be included in the tooltips to help with users' understanding of the effect of a command, what it does, etc. In some embodiments, timing may be faster if the user presses and holds on the center (and labels show up faster) vs. if they press and hold on an individual command.

In addition to enabling touch and/or gesture based actions, a context based menu according to embodiments may also react to keyboard entries, mouse clicks, and/or pen input. The system may detect additional user actions for activating tooltips such as hovering, as with a mouse, pressing and holding and/or hovering with a pen, and certain keyboard commands as some examples.

Figure 4:
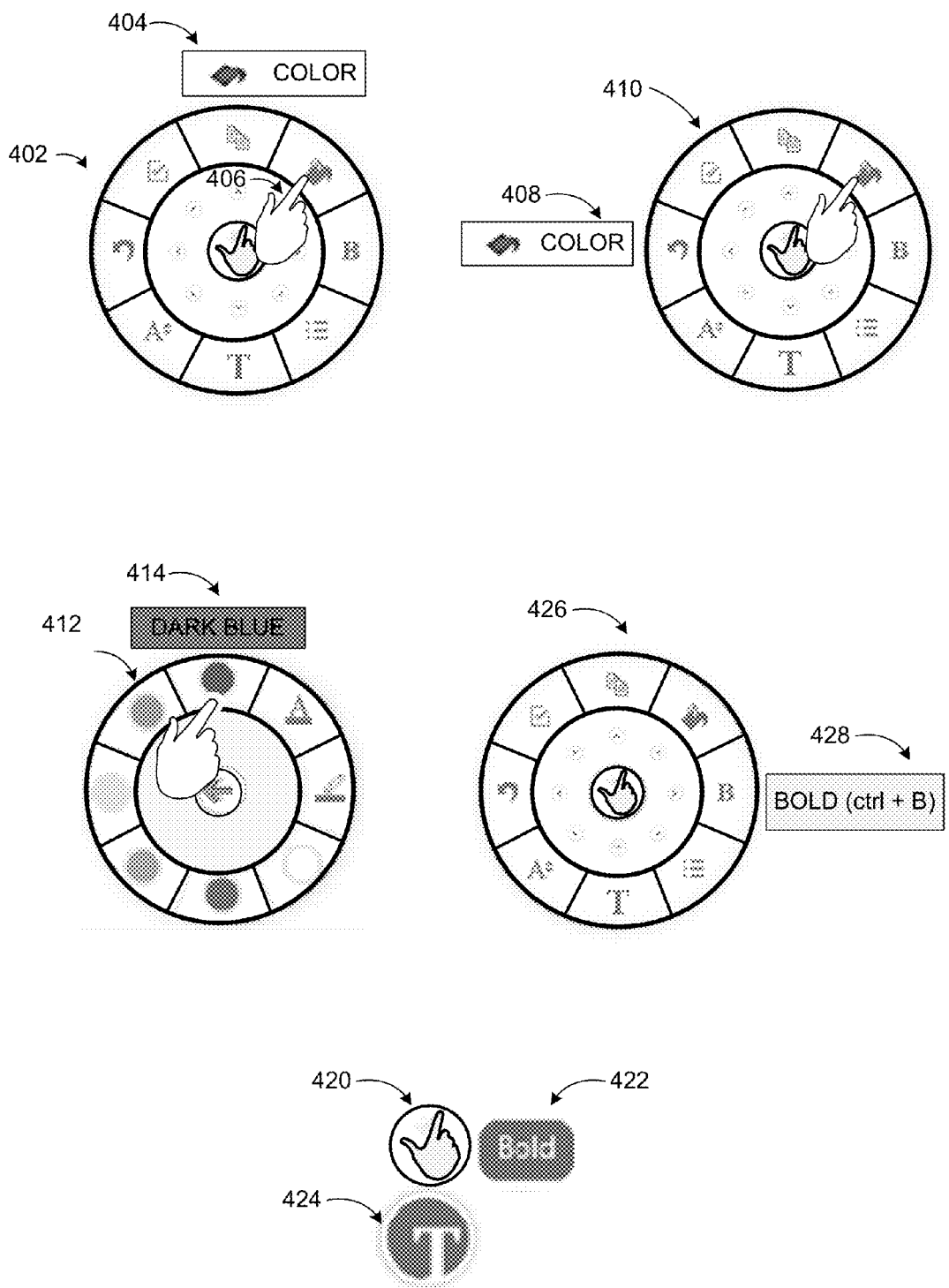
FIG. 4 illustrates example tooltips associated with commands on a context based menu according to embodiments.

FIG. 4 illustrates example tooltips associated with commands on a context based menu according to embodiments. As described previously in conjunction with FIGS. 3A and 3B, tooltips may be displayed to provide information about one or more commands on a context based menu. In some embodiments, the context based menu may display all of the tooltips concurrently, which may be labels, to indicate to the user the available executable commands on the context based menu. All of the tooltips may be displayed automatically and also in response to detection of a user action, and the tooltips may appear as short tooltips, or labels, and as descriptive tooltips for providing more information about the executable commands on the context based menu.

In a system according to embodiments, an individual tooltip may be provided in association with an individual command on the context based menu. The individual tooltip may be displayed to provide information about the command on the context based menu to the user before the user executes the command, and additionally, the individual tooltip may be displayed after execution of the command to indicate to the user what command was actually executed. For example, when a user performs a user action, such as a press and hold action, on an individual command represented by a graphical icon on the context based menu, a tooltip may appear to provide information to the user as to what command the graphical icon represents. As demonstrated in context based menu 402, when the user performs a press and hold action on the color command icon 406, an individual tooltip 404 associated with the color command icon 406 may automatically appear. The individual tooltip 404 may also display both text and the graphical icon for the command with which it is associated in order to help the user draw a connection to the command that the user has selected. This is particularly relevant in touch devices where the user's finger may be over the icon when the tooltip is displayed so they will not have any other visual connection between the icon and the text. Additionally, if a command on the context based menu or submenu 412 represents a color, the individual tooltip 414 may be shaded to match the color selection addition to displaying text for the color selection in the tooltip 414. The mapping between every color on the color palette and text is not required. The mapping may be done based on color ranges (e.g., Dark Blue, Blue, Light Blue). Further, the tooltip may be configured to display shortcut keyboard commands or "hotkeys" for a command on the context based menu. For example, as demonstrated in context based menu 426, the tooltip associated with the bold command 428 may display the shortcut command "Ctrl+B" to indicate to the user the keyboard shortcut command for executing the bold command 428.

The individual tooltip may be displayed in a variety of positions around the context based menu, such as above, below, and/or to the side of the context based menu, and additionally the individual tooltip 404 may appear next to the command with which it is associated. The system may be configured to automatically display the individual tooltip 404 in a consistent location, such as above the context based menu, as shown in context based menu 402, so that the user may become accustomed to viewing the tooltip in a consistent location, and also in a location least likely to be occluded by the user's finger. Additionally, if the context based menu is positioned near the top of the user interface such that the tooltip cannot be displayed above the context based menu, the individual tooltip may be displayed in a secondary location 408, such as to the left side of the context based menu 410. Further, if the left side secondary location is not available due to the position of the context based menu on the user interface, the individual tooltip may be displayed in additional alternative locations such as to the right of or below the context based menu. The default consistent location and the alternative locations for placement of the individual tooltip may be predefined by the system and additionally customized based on user preference. The tooltip may be a rectangle shape as discussed previously, and additionally the tooltip may be configured to curve around the context based menu in order to take up less space on the user interface and to enhance the visual effect for the user.

As previously discussed, the individual tooltip may appear when a user performs a press and hold action on a command on the context based menu. The press and hold action may be detected when the timing threshold for selection of the icon exceeds the tap threshold, which may be predefined by the system. In an additional embodiment, the tooltip may be configured to automatically appear based on a user action, such as a swipe action or press and hold action, on the initial launcher indicator 420. For example, some users may be familiar with the location of commands on the context based menu, and the user may swipe to execute a command directly from the launcher indicator 420, such that the system may perform the functionality associated with the command without displaying the context based menu. In such a scenario, the system may be configured to display a tooltip for the executed command for a brief period in order to indicate to the user that the command was executed. For example, if the user swipes toward the bold command from the launcher indicator 420, a bold command tooltip 422 may be displayed to indicate that the selection was changed to bold. Likewise, if the user swipes toward the font command from the launcher indicator 420, a font command tooltip 424 may be displayed.

Figure 5A:
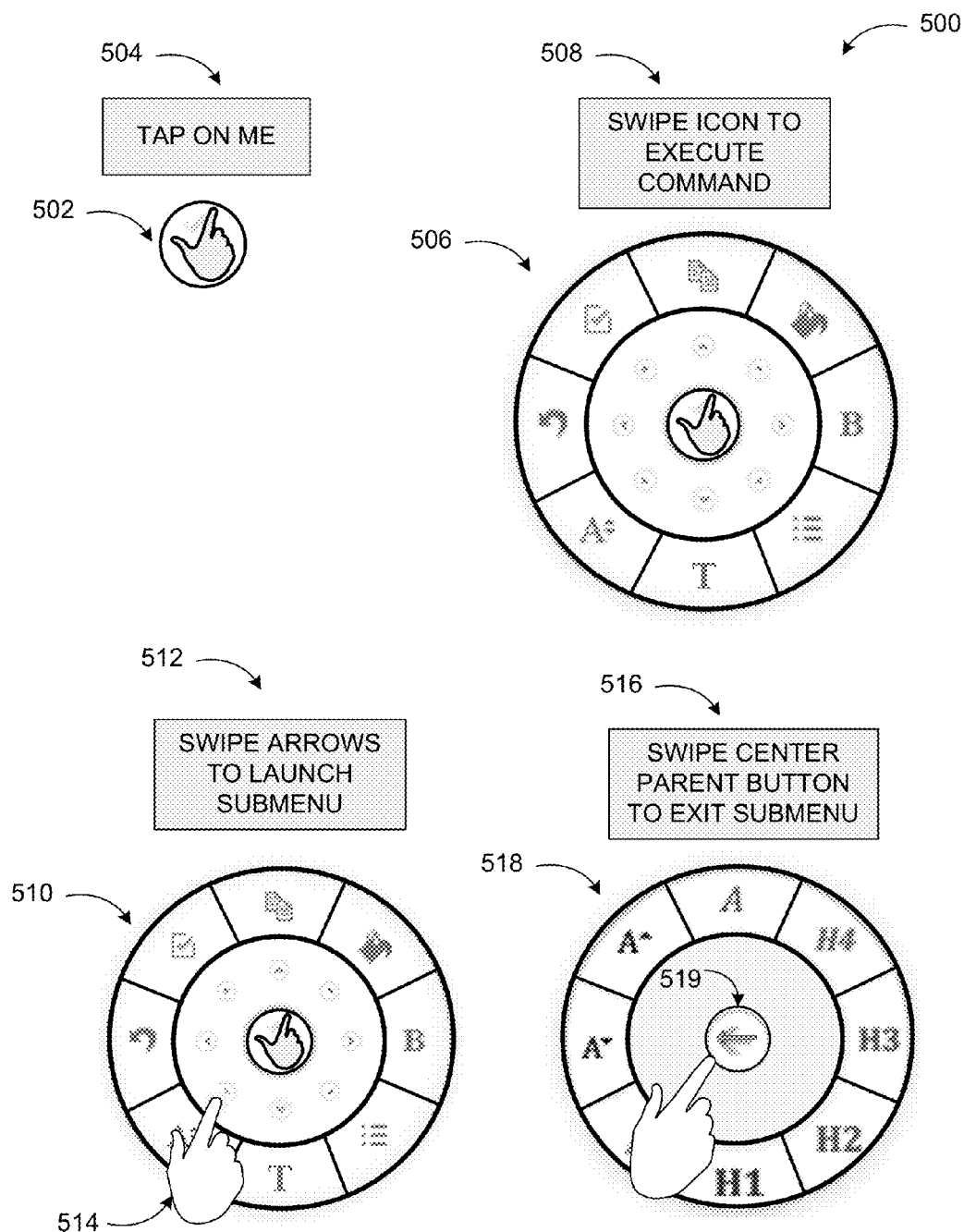
FIGS. 5A and 5B illustrate some instructional aspects of example tooltips associated with a context based menu according to some embodiments.
Figure 5B:
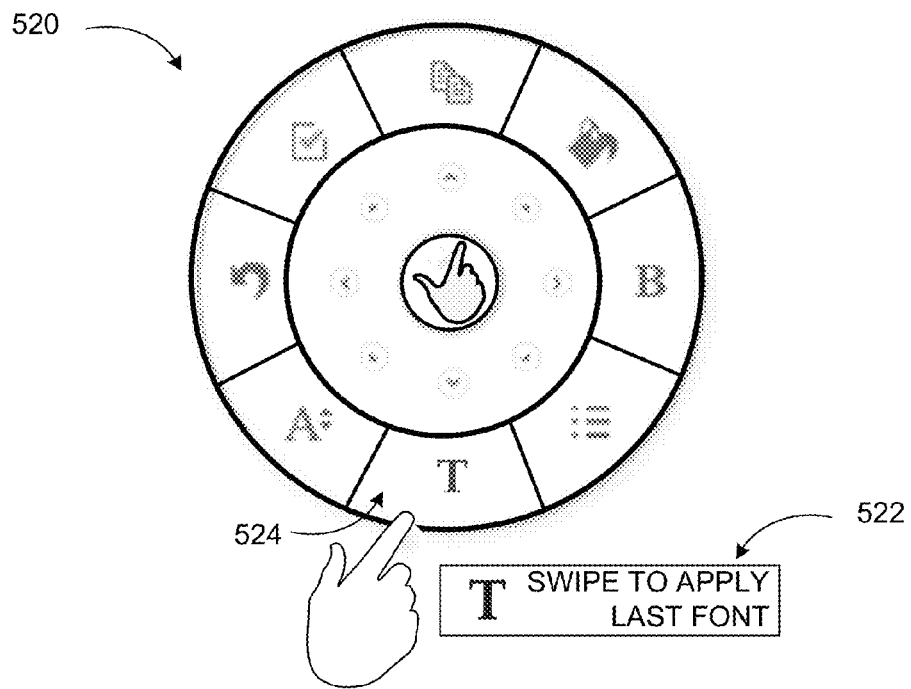
Figure 5B:
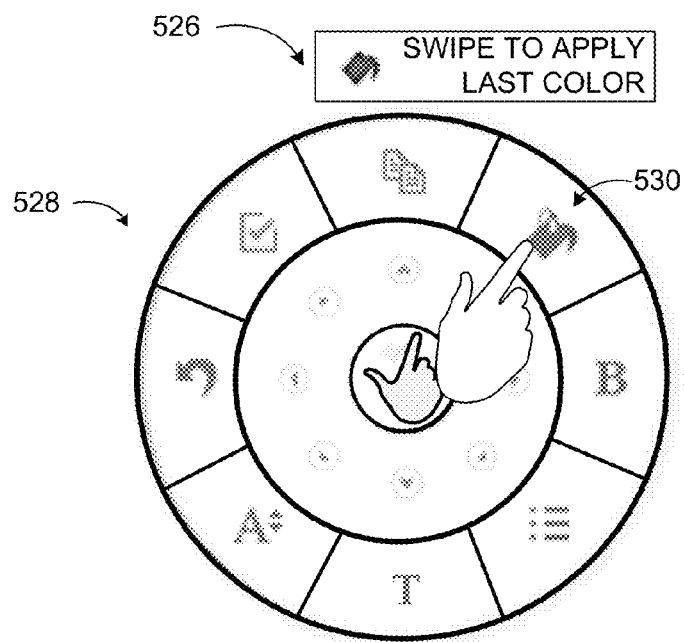

FIGS. 5A and 5B illustrate some instructional aspects of example tooltips associated with a context based menu according to some embodiments. As previously described, an individual tooltip may be displayed in order to provide information about the executable commands on the context based menu to the user. As demonstrated in diagram 500, in a system according to embodiments, one or more tooltips may be provided in order to teach a user how to interact with the user interface, including what actions and gestures the user can make, what commands may be available for execution from the context based menu, and the functionality of the commands.

In an example embodiment, when an initial launcher indicator 502 is displayed on a user device over the user interface, a launcher tooltip 504 may appear to instruct the user about how to interact with the launcher indicator 502, (e.g. tap on me to open context based menu with executable commands). The launcher tooltip 504 may be configured to automatically appear the first time the launcher indicator 502 is displayed to a user over the user interface. Additionally, the launcher tooltip 504 may be configured to appear on subsequent appearances of the launcher indicator if the launcher indicator 502 is displayed and the user has not performed an action on or near the launcher indicator 502 after a certain period of time, which may be a predefined period of inactivity set by the system and customizable according to user preference.

In an additional embodiment, a context based menu 506 may be expanded to display executable commands. When the context based menu 506 is initially expanded for the first time on the user interface, an instructional context based menu tooltip 508 may be configured to automatically appear in order to instruct the user how to interact with the context based menu 506 (e.g. Swipe icon to execute command). Additionally, upon subsequent displays of the context based menu 506, the instructional context based menu tooltip 508 may be configured to appear after a detected predefined period of inactivity, during which the user does not perform an action on or interact with the context based menu.

In a further embodiment, one or more submenus may be available for the user to select to navigate to for one or more of the commands on the context based menu 510, and an additional submenu launcher tooltip 512 may be provided to instruct the user on how to navigate to the submenu. The sub-menu tool tip may also provide a description of the kinds of commands contained in the sub menu/group (for example "paragraph formatting"). The submenu launcher tooltip 512 may be configured to appear automatically when the system detects that the context based menu includes submenu launchers and the user has never navigated to a submenu from the context based menu 510. Additionally, the submenu launcher tooltip 512 may be configured to appear upon detection of a press and hold action 514 by the user on or near the submenu launchers displayed on the context based menu 510. The submenu launcher tooltip 512 may instruct the user to perform an action, such as a tap or a swipe, on the submenu launchers in order to navigate to and expand the submenu. Further, once a submenu 518 has been displayed to the user, an additional submenu tooltip 516 may appear to instruct the user how to interact with the submenu 518. For example, the submenu tooltip 516 may automatically appear to instruct the user to perform an action on one of the commands on the context based menu in order to execute a command. Additionally, the submenu tooltip 516 may automatically appear upon a first appearance of the submenu 518 to instruct the user that the user may perform an action, such as a swipe or tap action, on the commands to execute a command and additionally on the center button 519 to close the submenu 518 and return to display of the context based menu.

In yet another embodiment, instructional tooltips may be provided in order to teach the user about default actions which may be executed from the context based menu. For example, in some scenarios, instead of opening a submenu associated with a command on the context based menu, tapping or swiping on the command on the context based menu may execute a default action for that command. For example, the font command 524 on the context based menu 520 may include a submenu for selecting font options associated with a selection on the user interface. If the user performs an action on the font command 524 to execute the font command 524 rather than navigating to the submenu to view and choose from the available font options, the system may apply the default action for the font command, which may be to apply the last font selected. A default font command tooltip 522 may be displayed in order to instruct the user that an action on the font command 524 may operate to apply the last selected font. Likewise, a color command icon 530 on the context based menu 528 may be associated with a submenu for selecting color options. For example, rather than just saying "Swipe to apply last color" the tooltip may state "Swipe to apply last color: Dark Blue" and the icon/tooltip color may be dark blue. If the user performs an action on the color command 530 to execute the color command 530 rather than navigating to the submenu to view and choose from the available color options, the system may apply the default action for the color command 530, which may be to apply the last selected color. A default color command tooltip 526 may be displayed in order to instruct the user that an action on the color command 530 may operate to apply the last selected color. In another embodiment, if the user presses a key on the keyboard to display the key tips (specifically ALT), the tooltip may be used to instruct users how to navigate to the submenus "Press Alt+SHIFT+key tip to navigate to the submenu."

Figure 6:
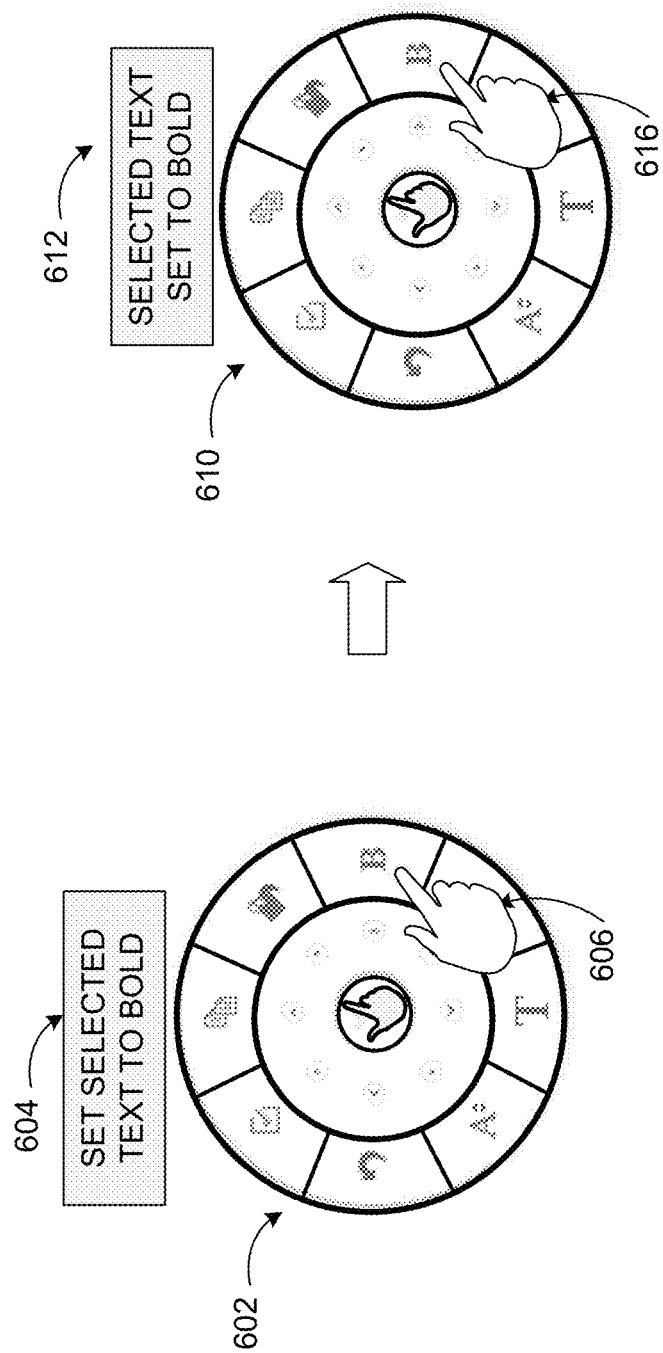
FIG. 6 illustrates use of pre and post tooltips associated with a context based menu according to some embodiments.

FIG. 6 illustrates use of pre and post tooltips associated with a context based menu according to some embodiments. As previously described, an individual tooltip may be displayed to provide information about a command on a context based menu to the user before the user executes the command, and additionally, the individual tooltip may be displayed after execution of the command to indicate to the user that the command was executed and what command was actually executed. As demonstrated in diagram 600, a tooltip that is presented to the user to provide information about a command on a context based menu 602 to the user before the user executes the command, may be a pre-tooltip 604. The pre-tooltip 604 may be displayed when the user performs a press and hold action 606 on a command on the context based menu 602. Additionally, the pre-tooltip may be displayed when the user hovers over the command if the user employs an input device such as a mouse for example. The pre-tooltip 604 may provide information to the user about what action may be executed upon selection of the command.

Further, a post-tooltip 612 may be displayed after the user has selected to execute a command from the context based menu 610. The post-tooltip 612 may serve to indicate to the user that the command was executed, and what action was actually performed on the selection on the user interface. For example, when the user performs an action 616 on the bold command icon on the context based menu 610, the post-tooltip 612 may appear to inform the user that the selected text on the user interface has been set to bold. In some scenarios, the user may not be able to see the selection on the user interface due to occlusion by the context based menu or by the user's finger and the post-tooltip 612 may serve to inform the user that the action has been executed. For example, if a portion of text is copied, it may not be clear to the user whether an action has been taken because there is no change on the canvas when the user copies something. The post-tooltip may indicate that content has been copied (e.g., "Copied: The quick brown fox . . . "). Additionally, in some scenarios, the post-tooltip 612 may be configured to provide a brief preview of the executed action, by displaying a portion of the selection with the executed action. The lack of post-tooltip 612 may also be used to remind a user that the context based menu 610 has been activated, but no action has been received.

The example context based menus, items, interactions, and configurations depicted in the above figures are provided for illustration purposes only. Embodiments are not limited to the shapes, forms, and content shown in the example diagrams, and may be implemented using other textual, graphical, and similar schemes employing the principles described herein.

Figure 7:
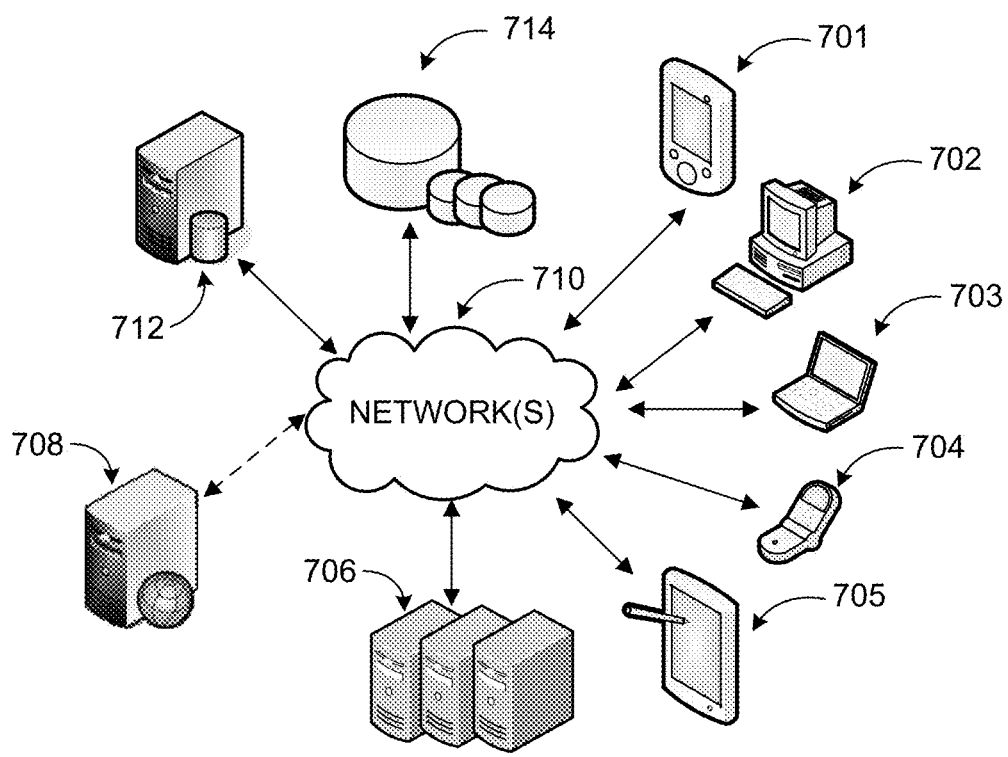
FIG. 7 is a networked environment, where a system according to embodiments may be implemented.

FIG. 7 is an example networked environment, where embodiments may be implemented. In addition to locally installed applications, such as application 822 discussed below, context based menus may also be employed in conjunction with hosted applications and services that may be implemented via software executed over one or more servers 706 or individual server 708. A hosted service or application may be a web-based service or application, a cloud based service or application, and similar ones, and communicate with client applications on individual computing devices such as a handheld computer 701, a desktop computer 702, a laptop computer 703, a smart phone 704, a tablet computer (or slate), 705 (client devices') through network(s) 710 and control a user interface presented to users. One example of a web-based service may be a productivity suite that provides word processing, spreadsheet, communication, scheduling, presentation, and similar applications to clients through a browser interface on client devices. Such a service may enable users to interact with displayed content through context based menus and a variety of input mechanisms as discussed herein.

As discussed, a context based menu may be used for controlling functionality provided by the hosted service or application. Tooltips may be displayed in conjunction with the context based menu to provide information about available commands for execution from the context based menu. Client devices 701-705 are used to access the functionality provided by the hosted service or application. One or more of the servers 706 or server 708 may be used to provide a variety of services as discussed above. Relevant data may be stored in one or more data stores (e.g. data store 714), which may be managed by any one of the servers 706 or by database server 712.

Network(s) 710 may comprise any topology of servers, clients, Internet service providers, and communication media. A system according to embodiments may have a static or dynamic topology. Network(s) 710 may include a secure network such as an enterprise network, an unsecure network such as a wireless open network, or the Internet. Network(s) 710 may also coordinate communication over other networks such as PSTN or cellular networks. Network(s) 710 provides communication between the nodes described herein. By way of example, and not limitation, network(s) 710 may include wireless media such as acoustic, RF, infrared and other wireless media.

Many other configurations of computing devices, applications, data sources, and data distribution systems may be employed to provide tooltips associated with context based menus. Furthermore, the networked environments discussed in FIG. 7 are for illustration purposes only. Embodiments are not limited to the example applications, modules, or processes.

Figure 8:
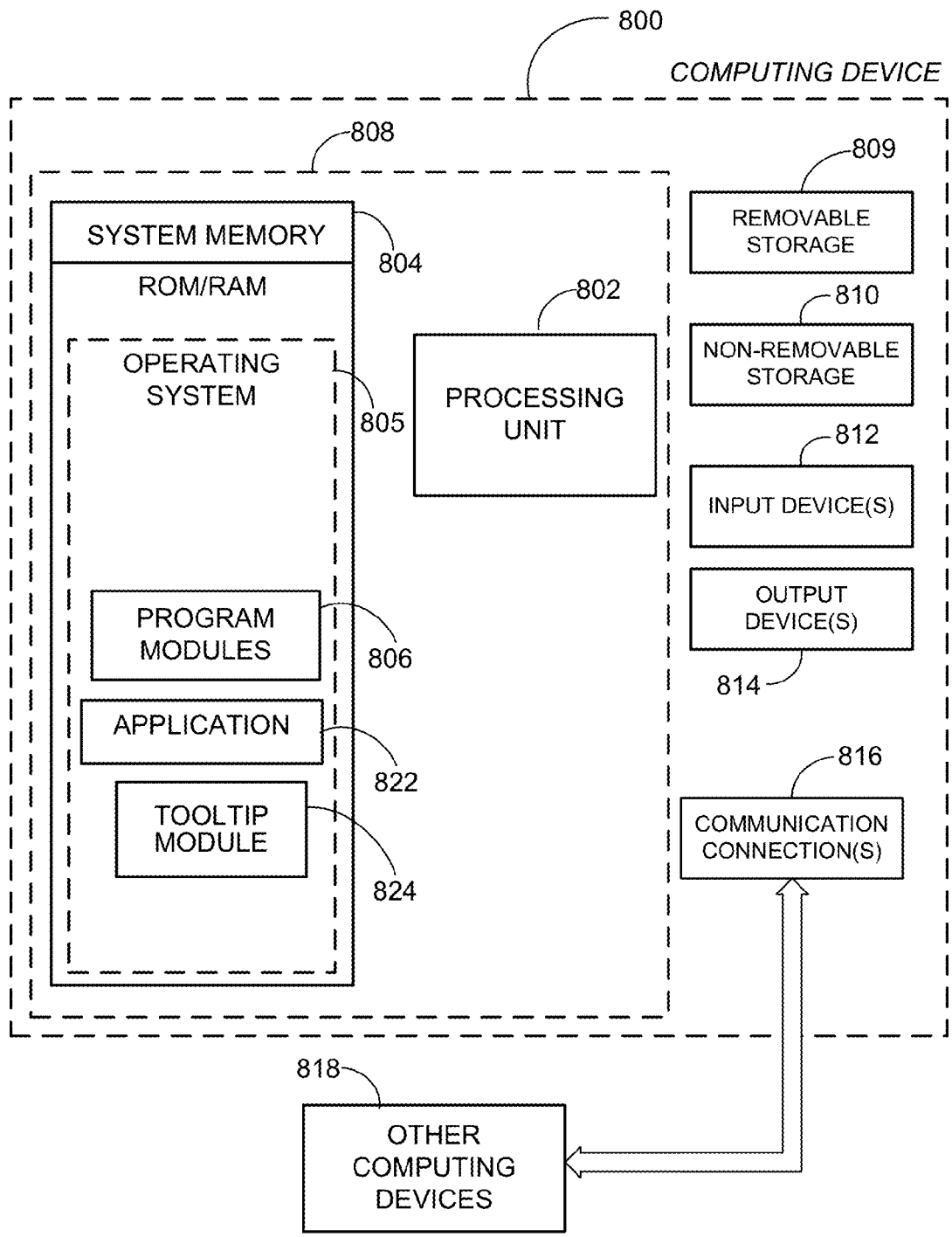
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may be any touch and/or gesture enabled device in stationary, mobile, or other form such as the example devices discussed in conjunction with FIGS. 1A and 1B, and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS®, WINDOWS MOBILE®, or WINDOWS PHONE® operating systems from MICROSOFT CORPORATION of Redmond, Wash. The system memory 804 may also include one or more software applications such as program modules 806, application 822 and tooltip module 824.

Tooltip module 824 may operate in conjunction with the operating system 805 or application 822 and display tooltips for providing a user with information about commands and actions associated with a context based menu as discussed previously. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, an optical capture device for detecting gestures, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wireless network in a distributed computing environment, a satellite link, a cellular link, and comparable mechanisms. Other devices 818 may include computer device(s) that execute communication applications, other directory or policy servers, and comparable devices. Communication connection(s) 816 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
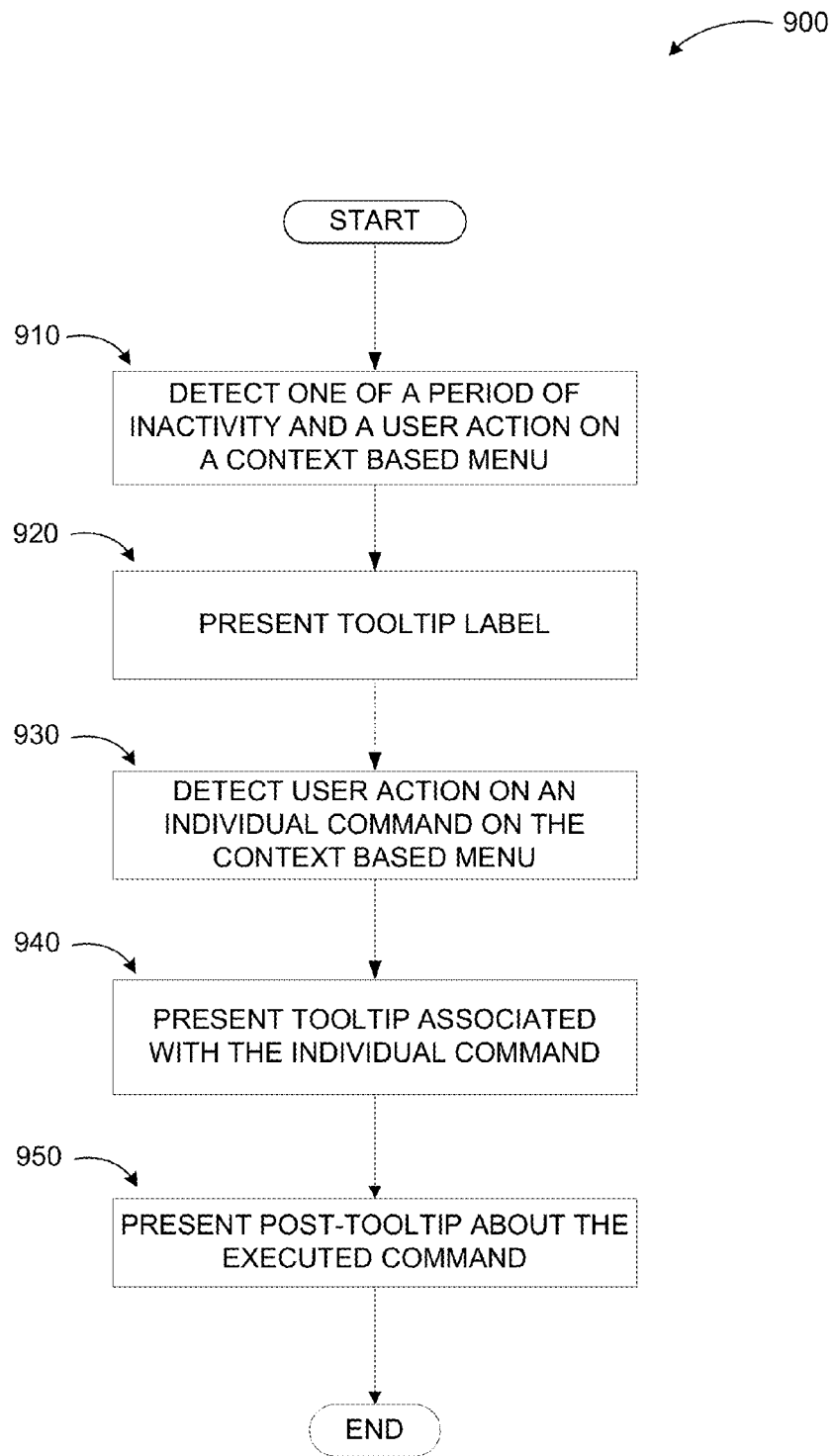
FIG. 9 illustrates a logic flow diagram for a process of employing a tooltip associated with a context based menu according to embodiments.

FIG. 9 illustrates a logic flow diagram for a process of employing a tooltip associated with a context based menu according to embodiments. Process 900 may be implemented as part of an application or an operating system.

Process 900 begins with operation 910, where the system may detect one of a period of inactivity and a user action on a context based menu. Upon detection of the period of inactivity and/or the user action on the context based menu, one or more tooltips may be presented in order to indicate what commands may be available from the context based menu at operation 920. The tooltips may provide a short label of what each command icon represents. The tooltips may be positioned on the interior or the exterior of the context based menu near the icons which the tooltip is associated. The tooltips may expand to multi-line descriptive tooltips to provide more information about the command icons on the context based menu.

At operation 930 the system may detect a user action, such as a press and hold action, on an individual command icon on the context based menu. Following detection of the press and hold action, at operation 940 the system may display a tooltip associated with the individual command providing more information about the available command. The tooltip associated with the individual command may be positioned above, below, and/or next to the command on the context based menu in a position which avoids occlusion by the user's finger while making a selection on the context based menu. Operation 940 may be followed by operation 950 where after execution of the command, the system may display a post-tooltip which may indicate that the command was executed and may provide information about the executed command. The post-tooltip may additionally provide a brief preview of the executed command.

The operations included in process 900 are for illustration purposes. Presenting tooltips associated with context based menus according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed in a computing device for providing a textual assistance associated with a context based menu, the method comprising:
   detecting the context based menu displayed on a user interface in one of a collapsed and expanded state, wherein the context based menu appears adjacent to a focus point including one of: an insertion point and a selection point, and allows commands associated with one or more items represented by one or more graphical icons that are displayed on the context based menu to be scoped by context;
   in response to a first selection of the one or more items on the context based menu, displaying a pre-tooltip associated with the first selected item, wherein the pre-tooltip provides a first information that describes a first action to be executed on an activation of the first selected item;
   in response to detecting an activation of the first selected item,
      executing the first action associated with the first selected item; and
      displaying a post-tooltip associated with the first selected item, wherein the post-tooltip provides a second information that describes a performance of the first action;
   positioning the pre-tooltip and the post-tooltip on one of an interior and an exterior of the context based menu in response to the first selection and the activation; and
   in response to positioning the pre-tooltip and the post-tooltip on the exterior of the context based menu, configuring the pre-tooltip and the post-tooltip to curve around the context based menu and presenting the pre-tooltip and the post-tooltip at an offset from one of the one or more graphical icons associated with the first selected item to avoid an occlusion of the pre-tooltip and the post-tooltip on the context based menu.

2. The method of claim 1, wherein the first selected item is selected by one or more of: a press and hold action, a swipe action, a keyboard entry combination, a hovering action by a mouse input, a press and hold action and a hovering action by a pen input, a tap action on the first selected item, an accelerometer sensor based input, an orientation sensor based input, an optically captured gesture, a time based input, a proximity to another device, a proximity to another person, and a proximity to a place.

3. The method of claim 2, wherein the press and hold action and the hovering action have a greater timing threshold than a timing threshold for the tap action on the first selected item, such that the press and hold action and the hovering action are operative to activate the pre-tooltip and the post-tooltip.

4. The method of claim 1, wherein the pre-tooltip and the post-tooltip include a label that provides a short description of the first selected item, and wherein the pre-tooltip and the post-tooltip are displayed adjacent to other tooltips associated with a remaining subset of the one or more items.

5. The method of claim 4, further comprising:
   in response to a determination of a period of inactivity following an display of the context based menu, displaying the label associated with the pre-tooltip on the context based menu, wherein the label accommodates text within a predefined region of the user interface.

6. The method of claim 5, farther comprising:
   presenting the label along one of: a left side, a right side, a top, and a bottom of one or more items of the context based menu based on one of: a default parameter, an available display area, a location of the context based menu on the user interface, an attribute of the user, a content on a displayed page, and at least one other displayed user interface element.

7. The method of claim 6, further comprising:
   expanding the label to descriptive tooltips displayed outside the context based menu, wherein the descriptive tooltips provide additional information associated with the one or more items on the context based menu.

8. The method of claim 7, wherein the descriptive tooltips accommodate at least one from a set of: multiple lines of text with a greater maximum number of characters than the label, a graphic, and an image.

9. The method of claim 1, wherein the pre-tooltip and the post-tooltip provide information about the one or more items displayed on the context based menu associated with one or more of: what the graphical icons for the one or more items represent, how to interact with the context based menu on the user interface, actions for executing the commands on the context based menu, the commands available for execution on the context based menu, a description of a type of the commands available in a sub-menu, a functionality of the commands available for execution on the context based menu, how to navigate to a submenu associated with the context based menu, default actions that can be executed from the context based menu, and a last command executed in response to a user action on the one or more items, and wherein a language of the information provided by the pre-tooltip and the post-tooltip are determined based on a user attribute.

10. The method of claim 1, further comprising:
in response to the first selection of the one or more items on the context based menu, presenting the pre-tooltip associated with the one or more items on the context based menu at a location near one of: a left side, a right side, a top, and a bottom of the context based menu, which is least likely to he occluded by a finger of the user, wherein the location of the pre-tooltip are selected based on at least one from a set of: a default parameter, an available display area, a location of the context based menu on the user interface, an attribute of the user, a content on a displayed page, and at least one other displayed user interface element.

11. The method of claim 10, further comprising:
modifying the location of the pre-tooltip and the post-tooltip in response to a change in on at least one from a set of: a displayed content on the user interface, an available display area, and a location of the context based menu.

12. The method of claim 1, further comprising:
displaying the pre-tooltip faster in response to a press and hold action at a center of the context based menu compared to the press and hold action on an individual item on the context based menu.

13. A computing device for providing tooltips associated with a context based menu, the computing device comprising:
an input device;
a memory;
a processor coupled to the memory and the input device, the processor executing an application and causing a user interface associated with the application to be displayed on a screen, wherein the processor is configured to:
detect the context based menu displayed on the user interface, wherein the context based menu allows commands associated with one or more items represented by one or more graphical icons that are displayed on the context based menu to be scoped by context;
in response to a first selection of the one or more items on the context based menu, display a pre-tooltip associated with the first selected item, wherein the pre-tooltip provides a first information that describes a first action to be executed on an activation of the first selected item;
in response to detecting an activation of the first selected item,
execute the first action associated with the first selected item; and
display a post-tooltip associated with the first selected item, wherein the post-tooltip provides a second information that describes a performance of the first action;
position the pre-tooltip and the post-tooltip on one of an interior and an exterior of the context based menu in response to the first selection and the activation; and
in response to positioning the pre-tooltip and the post-tooltip on the exterior of the context based menu, configure the pre-tooltip and the post-tooltip to curve around the context based menu and presenting the pre-tooltip and the post-tooltip at an offset from one of the one or more graphical icons associated with the first selected item to avoid an occlusion of the pre-tooltip and the post-tooltip on the context based menu.

14. The computing device of claim 13, wherein the processor is further configured to:
employ one or more of a color scheme, an animation scheme, a graphical scheme, a textual scheme, and a shading scheme to emphasize an association of one of the pre-tooltip and the post-tooltip with a corresponding item of the one or more items.

15. The computing device of claim 13, wherein the application is one of a web-based application and a cloud-based application enabling the user to interact with content displayed through a browser on a client device.

16. A method executed in a computing device for providing tooltips associated with a context based menu on a touch and gesture enabled device, the method comprising:
detecting the context based menu displayed on a user interface, wherein a location of the context based menu is selected at one of a fixed location on the user interface and a dynamically selected location based on one or more of: a selected portion of a plurality of displayed content, a displayed content type, an available display area, a plurality of user interface borders, and a device type, and wherein the context based menu allows commands associated with one or more items represented by one or more graphical icons that are displayed on the context based menu to be scoped by context;
in response to a first selection of the one or more items on the context based menu, displaying a pre-tooltip associated with the first selected item, wherein the pre-tooltip provides a first information that describes a first action to be executed on an activation of the first selected item;
in response to detecting an activation of the first selected item,
executing the first action associated with the first selected item; and
displaying a post-tooltip associated with the first selected item, wherein the post-tooltip provides a second information that describes a performance of the first action;
positioning the pre-tooltip and the post-tooltip on one of an interior and an exterior of the context based menu in response to the first selection and the activation; and
in response to positioning the pre-tooltip and the post-tooltip on the exterior of the context based menu, configuring the pre-tooltip and the post-tooltip to curve around the context based menu and presenting the pre-tooltip and the post-tooltip at an offset from one of the one or more graphical icons associated with the first selected item to avoid an occlusion of the pre-tooltip and the post-tooltip on the context based menu.

17. The method of claim 16, further comprising:
hiding the pre-tooltip and the post-tooltip after an expiration of a time period, wherein the pre-tooltip and the post-tooltip are presented and hidden in an animated fashion.

* * * * *